No. 644,568. Patented Mar. 6, 1900.
W. J. BALDWIN.
STEAM TRAP.
(Application filed July 10, 1899.)
(No Model.)

Witnesses
Charles Hanimann
Henry V. Brown

Inventor
William J. Baldwin
By his Attorney
Walter Brown

UNITED STATES PATENT OFFICE.

WILLIAM J. BALDWIN, OF NEW YORK, N. Y.

STEAM-TRAP.

SPECIFICATION forming part of Letters Patent No. 644,568, dated March 6, 1900.

Application filed July 10, 1899. Serial No. 723,295. (No model.)

*To all whom it may concern:*

Be it known that I, WILLIAM J. BALDWIN, a citizen of the United States, residing in the city of New York, borough of Brooklyn, State of New York, have invented certain new and useful Improvements in Steam-Traps, of which the following is a specification.

This invention relates to improvements in steam-traps, particularly of the type known as "open-bucket" or "pot" traps.

The purpose of the invention is to furnish a trap which shall contain in itself both the by-pass, which is necessary in case of cleaning or repairing the trap, and the steam-passages to and through the trap, and also to control all necessary changes of direction of the steam and entrained water through or around the trap with the smallest possible number of valves. My invention therefore provides a self-contained trap with all passages, including a by-pass, arranged in the trap itself, so that no separate construction of a by-pass is necessary where a trap is put in a steam plant.

Figure 1:
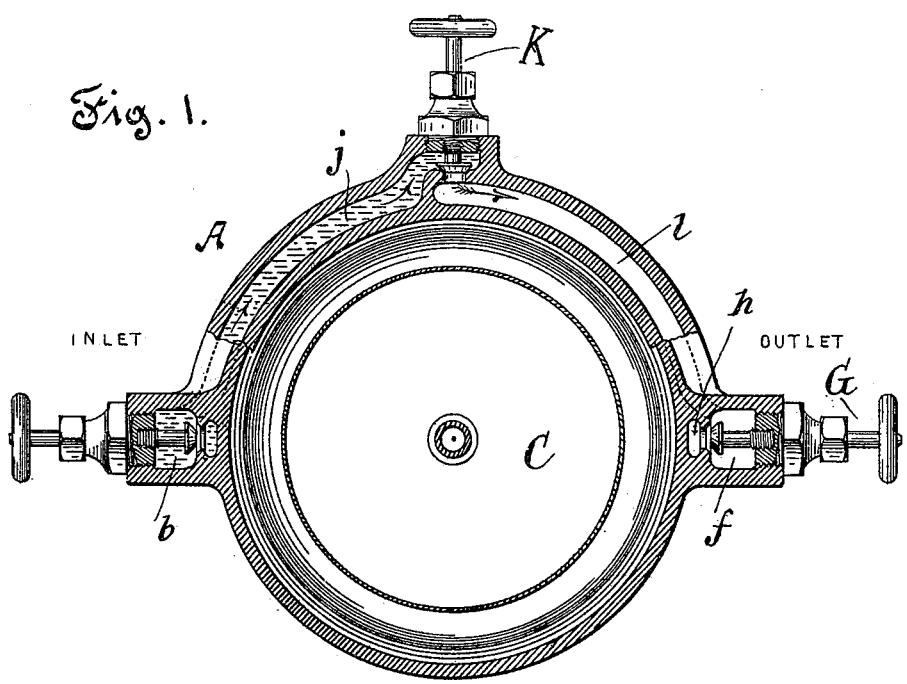
Figure 2:
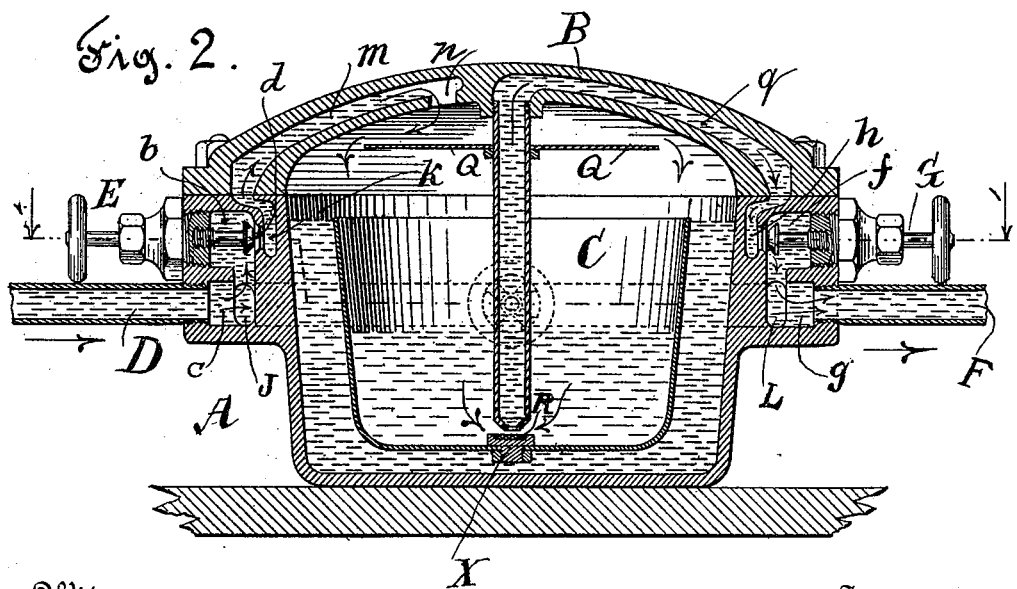

Referring to the drawings which accompany the specification, Figure 1 shows a horizontal section, partly in one plane and partly in another; and Fig. 2 is a central vertical section of the trap.

A is the body, B the cover, and C the float. The chamber $b$ on the inlet side of the trap connects with the drip-pipe D from the steam plant through the port $c$ and with an outlet $d$, controlled by the valve E. The similar chamber $f$ on the outlet side of the trap connects with the pipe F, which leads to the sewer or other point of discharge by the port $g$, G being a valve controlling the inlet to said chamber from channel $h$. A by-pass composed of two passages $j$ $l$, the connection between which is controlled by the valve K, which is normally closed, is formed, as indicated, in the wall of trap A and leads from port $c$ to port $g$. A channel $m$ in cover B leads from the channel $k$, which connects with the outlet of said chamber $b$, to the port $n$, from which the steam and entrained water deflect over the baffle-plate Q and descend into the annular space between the trap A and float C. A pipe $p$, open at its lower end, depends from cover B and at its upper end connects with one end of the channel $q$, also formed on cover B and connecting at its other end with the channel $r$, which leads to chamber $f$. A valve-disk R on float C closes the lower end of pipe $p$ when said float rises and opens the same when the float descends. As is well understood, the said float C rises as the condensed water runs into the trap and remains up until the water flows over the top and fills said float, when it descends. Now the steam-pressure forces the water out from the float through pipe $p$ to the place of discharge, and the float being empty again rises, closing the end of pipe $p$.

Should it be necessary to remove cover B to clean or repair the trap, valves E G are closed and valve K opened, and now the drip from the steam plant goes away through by-pass $j$ $l$, while cover B can be removed without danger or inconvenience. When the trap is cleaned or repaired, the cover is again bolted on, valves E G opened, and valve K closed, and the trap operates as before.

Now, having described my improvements, I claim as my invention—

1. A self-contained steam-trap having a pot-float and provided with an inlet and an outlet, a by-pass from said inlet to said outlet in the wall of the trap, a valve controlling said by-pass, a cover provided with inlet and outlet passages, and valves controlling the connections of said passages with the main inlet and outlet, substantially as described.

2. The combination in a steam-trap of a pot-float adapted to control the discharge from the trap, passages in the cover normally connecting the inlet with the interior of the trap and the interior of the trap with the discharge-outlet, valves controlling said passages, a by-pass in the wall of the trap leading from the inlet to the outlet and a valve controlling said by-pass, substantially as described.

WILLIAM J. BALDWIN.

Witnesses:
HENRY V. BROWN,
BERNARD J. ISECKE.